United States Patent [19]
Eisert et al.

[11] Patent Number: 4,597,912
[45] Date of Patent: Jul. 1, 1986

[54] BASIC COLORANTS

[75] Inventors: Manfred Eisert, Ludwigshafen; Klaus Grychtol, Bad Durkheim, both of Fed. Rep. of Germany

[73] Assignee: BASF Aktiengesellschaft, Rheinland-Pfalz, Fed. Rep. of Germany

[21] Appl. No.: 735,298

[22] Filed: May 17, 1985

Related U.S. Application Data

[63] Continuation of Ser. No. 188,264, Sep. 17, 1980, abandoned.

[30] Foreign Application Priority Data

Oct. 18, 1979 [DE] Fed. Rep. of Germany ....... 2942185

[51] Int. Cl.$^4$ ................... C07C 121/70; C07C 121/72
[52] U.S. Cl. ......................................... 558/403; 8/919; 162/162; 544/163; 544/393; 544/395; 546/230; 548/578
[58] Field of Search ................................. 260/465 D

[56] References Cited

U.S. PATENT DOCUMENTS

| | | | |
|---|---|---|---|
| 3,742,012 | 6/1973 | Bauman | 260/465 D |
| 4,017,486 | 4/1977 | Buell et al. | 260/465 D X |
| 4,063,882 | 12/1977 | Steiner | 260/465 D X |
| 4,235,806 | 11/1980 | Desai | 260/465 D |
| 4,280,964 | 7/1981 | Grychtol | 260/465 D |

FOREIGN PATENT DOCUMENTS 2747365  5/1978  Fed. Rep. of Germany .

Primary Examiner—Joseph Paul Brust
Attorney, Agent, or Firm—Oblon, Fisher, Spivak, McClelland & Maier

[57]  ABSTRACT

A compound of the formula:

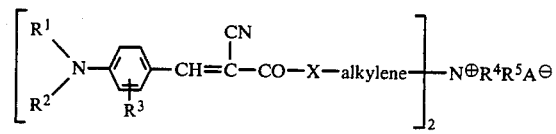

wherein $R^1$ and $R^2$ independently of one another are unsubstituted or hydroxy substituted, $C_1$–$C_4$ alkoxy substituted, cyano substituted, $C_1$–$C_4$ alkoxycarbonyl substituted, di-$C_1$–$C_4$ alkylamino substituted, $(CH_3)(C_6H_5CH_2)NC_2H_4$ substituted, chlorine substituted or bromine substituted $C_1$–$C_4$-alkyl, cyclohexyl, benzyl, phenylethyl or phenyl, $R^1$ and $R^2$ together with the nitrogen are morpholino, pyrrolidino, piperidino or N-methylpiperazino;

$R^3$ is hydrogen, chlorine, bromine, methyl, ethyl, methoxy, ethoxy or nitro;

$R^4$ and $R^5$ independently of one another are hydrogen, $C_1$–$C_4$-alkyl or benzyl; X is oxygen or imino; $A^-$ is an anion selected from the group of chloride, bromide, sulfate, nitrate, dihydrogen phosphate, methosulfate, ethosulfate, thiocyanate, formate, acetate, propionate, chloroacetate, citrate and lactate; and the alkylene radicals of 2 to 6 carbon atoms in the cyano substituted cinnamoyl groups are independent of each other and are linear or branched. The present compound is particularly suitable for coloring paper pulps.

3 Claims, No Drawings

BASIC COLORANTS

This application is a continuation, of application Ser. No. 188,264, filed Sept. 17, 1980, now abandoned.

The present invention relates to compounds of the general formula I

A-B-A (I)

where A is a radical of the formula

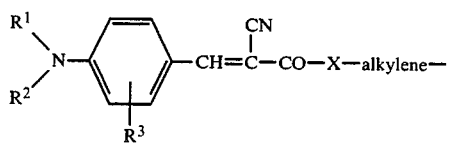

and B is a bridge member of the formula

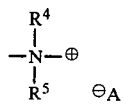

and where $R^1$ and $R^2$ independently of one another are unsubstituted or hydroxy-, $C_1$–$C_4$-alkoxy-, cyano-, $C_1$–$C_4$-alkoxycarbonyl-, di-$C_1$–$C_4$-alkylamino-, chlorine- or bromine-substituted $C_1$–$C_4$-alkyl, cyclohexyl, benzyl, phenylethyl or phenyl, or $R^1$ and $R^2$ together with the nitrogen are morpholino, pyrrolidino, piperidino or N-methylpiperazino, $R^3$ is hydrogen, chlorine, bromine, methyl, ethyl, methoxy, ethoxy or nitro, $R^4$ and $R^5$ independently of one another are hydrogen, $C_1$–$C_4$-alkyl or benzyl, X is oxygen or imino and alkylene is of 2 to 6 carbon atoms and is linear or branched.

Examples of radicals $R^1$ and $R^2$, in addition to those already specifically mentioned, are $CH_3$, $C_2H_5$, $C_3H_7$, $C_4H_9$, $C_2H_4OH$, $CH_2CHOHCH_3$, $C_2H_4OCH_3$, $C_2H_4OC_2H_5$, $C_2H_4OC_3H_7$, $C_2H_4CN$, $C_2H_4COOCH_3$, $C_2H_4COOC_2H_5$, $C_2H_4Cl$, $C_2H_4N(CH_3)_2$, $C_2H_4N(C_2H_5)_2$, $C_2H_4N(C_3H_7)_2$, $C_2H_4N(C_4H_9)_2$, $CH_2CN$ and

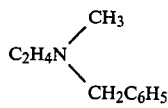

Examples of alkylene radicals are —$CH_2$—$CH_2$—, —$CH_2$—CH—$CH_3$, —$CH_2$—$CH_2$—$CH_2$—, —$CH_2$—$CH_2$—$CH_2$—$CH_2$—,

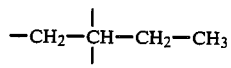

and $CH_3$—CH—CH—$CH_3$

Examples of bridge members B are

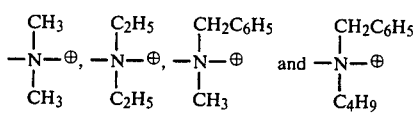

Examples of anions $A^\ominus$ are: chloride, bromide, sulfate, nitrate, dihydrogen phosphate, methosulfate, ethosulfate, thiocyanate, formate, acetate, propionate, chloroacetate, citrate and lactate.

The compounds of the formula I may be prepared by reacting an aldehyde of the formula II

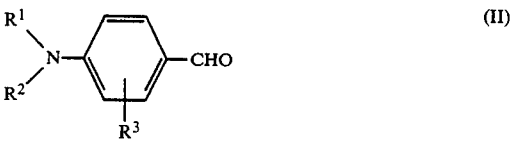

with a compound of the formula III

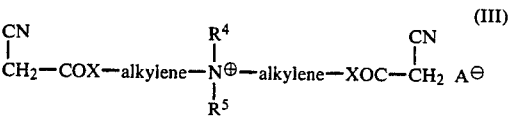

The compounds of the formula I, where X is oxygen, may also be prepared by reacting a compound of the formula IV

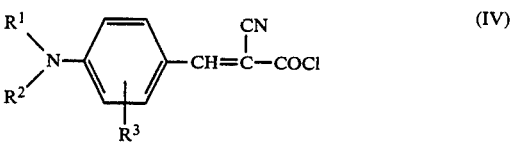

with a compound of the formula V

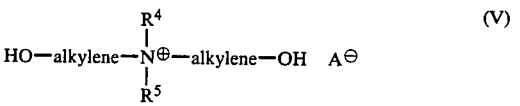

Details of the methods of synthesis are to be found in the Examples.

The compounds of the formula I are yellow. They are very suitable for coloring paper and, in this application, exhibit very high affinity. Some of the compounds of the formula I are very readily soluble in alcohol. These colorants may be used for the preparation of printing inks.

In the Examples which follow, parts are by weight.

EXAMPLE 1

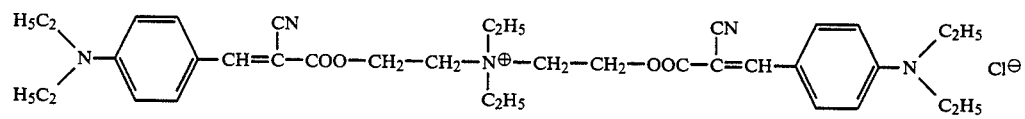

20.4 parts of cyanoacetic acid and 72 parts of acetic anhydride are stirred for 30 minutes at 50° C. and 23.7 parts of diethyl-bis-hydroxyethyl-ammonium chloride (prepared by reacting stoichiometric amounts of diethylethanolamine and ethylene chlorohydrin in i-butanol) and 42.4 parts of p-diethylaminobenzaldehyde are then added. The mixture is heated to 90° C. and kept at this temperature for 3 hours. It is then cooled to room temperature. 50 parts of ethyl acetate are added, the mixture is stirred for an hour and the product is then filtered off, washed with ethyl acetate and dried. 65 parts of a colorant which colors paper in pure greenish yellow hues are obtained. The effluent is barely colored. $\lambda_{max}$433 nm.

Yellow colorants for paper are also obtained by using the following aldehydes or mixtures of these:

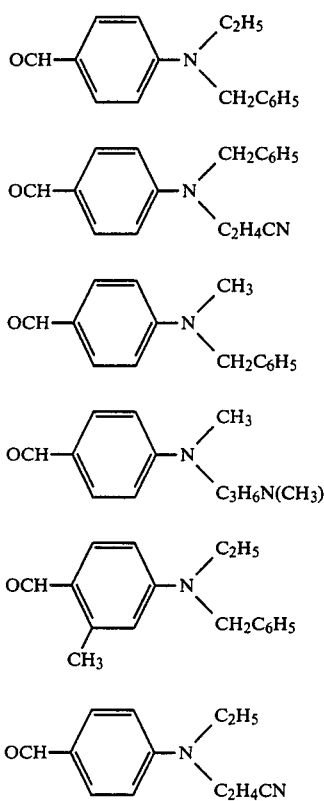

EXAMPLE 2

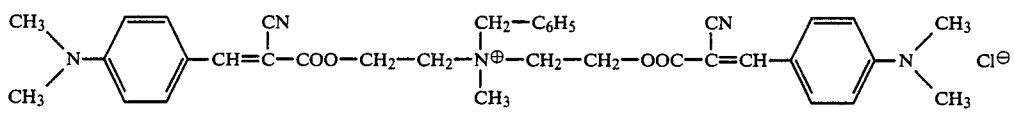

20.4 parts of cyanoacetic acid and 74 parts of acetic anhydride are stirred for 30 minutes at 50° C., and 30 parts of bis-hydroxyethyl-methylbenzyl-ammonium chloride (prepared by reacting stoichiometric amounts of methyldiethanolamine and benzyl chloride in acetone) and 35.8 parts of p-dimethylaminobenzaldehyde are then added. The mixture is heated to 80° C. and stirred at this temperature for 10 hours. It is then cooled to room temperature. A liquid colorant is obtained, which gives pure greenish yellow hues on paper. The effluent has only a very pale color. $\lambda_{max}$422 nm.

The following aldehydes also give yellow liquid colorants:

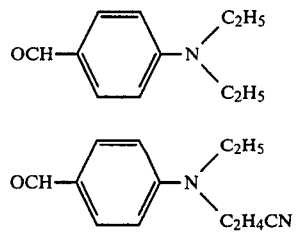

EXAMPLE 3

The procedure described in Example 2 is followed, after which the volatile constituents are removed from the liquid colorant by distillation under reduced pressure at 80° C. The resinous colorant thereby obtained is mixed with an equal amount of ethanol and is thereby dissolved. A liquid colorant, which is very suitable for the production of printing inks, is obtained.

EXAMPLE 4

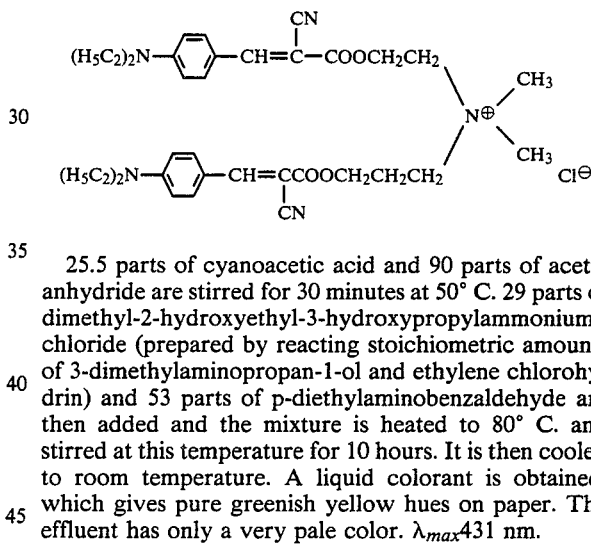

25.5 parts of cyanoacetic acid and 90 parts of acetic anhydride are stirred for 30 minutes at 50° C. 29 parts of dimethyl-2-hydroxyethyl-3-hydroxypropylammonium chloride (prepared by reacting stoichiometric amounts of 3-dimethylaminopropan-1-ol and ethylene chlorohydrin) and 53 parts of p-diethylaminobenzaldehyde are then added and the mixture is heated to 80° C. and stirred at this temperature for 10 hours. It is then cooled to room temperature. A liquid colorant is obtained, which gives pure greenish yellow hues on paper. The effluent has only a very pale color. $\lambda_{max}$431 nm.

Yellow colorants for paper are also obtained with the following aldehydes or mixtures of these aldehydes:

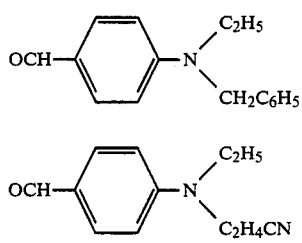

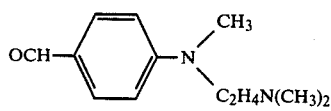

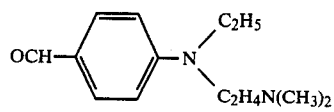

EXAMPLE 5

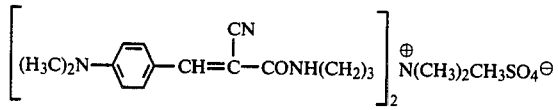

56.5 parts of ethyl cyanoacetate, 36.3 parts of bis-(3-aminopropyl)-methylamine and 250 parts of perchloroethylene are refluxed for 2 hours. The mixture is then cooled to room temperature and 32 parts of dimethyl sulfate are slowly added dropwise. The reaction mixture is then stirred under reflux for 2 hours, mixed with 74.5 parts of p-dimethylaminobenzaldehyde and refluxed for a further 6 hours.

On distilling off the solvent, a viscous oil is obtained, which crystallizes on addition of acetone. The precipitate is filtered off, washed with acetone and dried. 94 parts of a colorant, which colors paper in yellow hues, are obtained. $\lambda_{max}$ 414 nm.

Yellow colorants are also obtained with the following aldehydes or mixtures of these aldehydes:

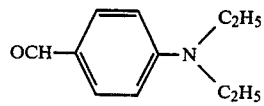

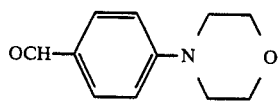

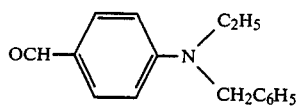

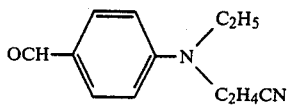

We claim:
1. A compound of the formula:

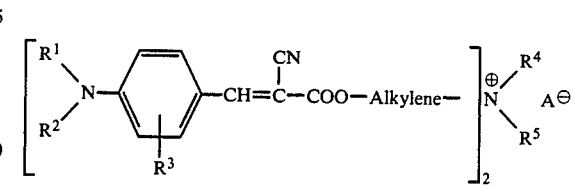

wherein
$R^1$ and $R^2$ independently of one another are methyl or ethyl;
$R^3$ is hydrogen;
$R^4$ and $R^5$ independently of one another are hydrogen, $C_1$- to $C_4$-alkyl or benzyl; and
$A^\ominus$ is an anion selected from the group consisting of chloride, bromide, sulfate, nitrate, dihydrogen phosphate, methosulfate, ethosulfate, thiocyanate, formate, acetate, propionate, chloroacetate, citrate and lactate; and the alkylene radicals of 2 to 6 carbon atoms in the cyano substituted cinnamoyl groups are independent of each other and are linear or branched.

2. The compound of claim 1, wherein said alkylene radical is —CH$_2$CH$_2$—, —CH$_2$CH(CH$_3$)—, —CH$_2$CH$_2$CH$_2$—, —CH$_2$CH$_2$CH$_2$CH$_2$—,

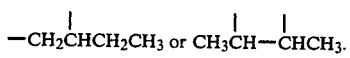

3. The compound of claim 1, wherein $R^4$ and $R^5$ are each selected from the group consisting of methyl, ethyl, butyl or benzyl.

* * * * *